May 7, 1935.  D. SEGER ET AL  2,000,865
KINGPIN ANGLE GAUGE
Filed Sept. 1, 1932
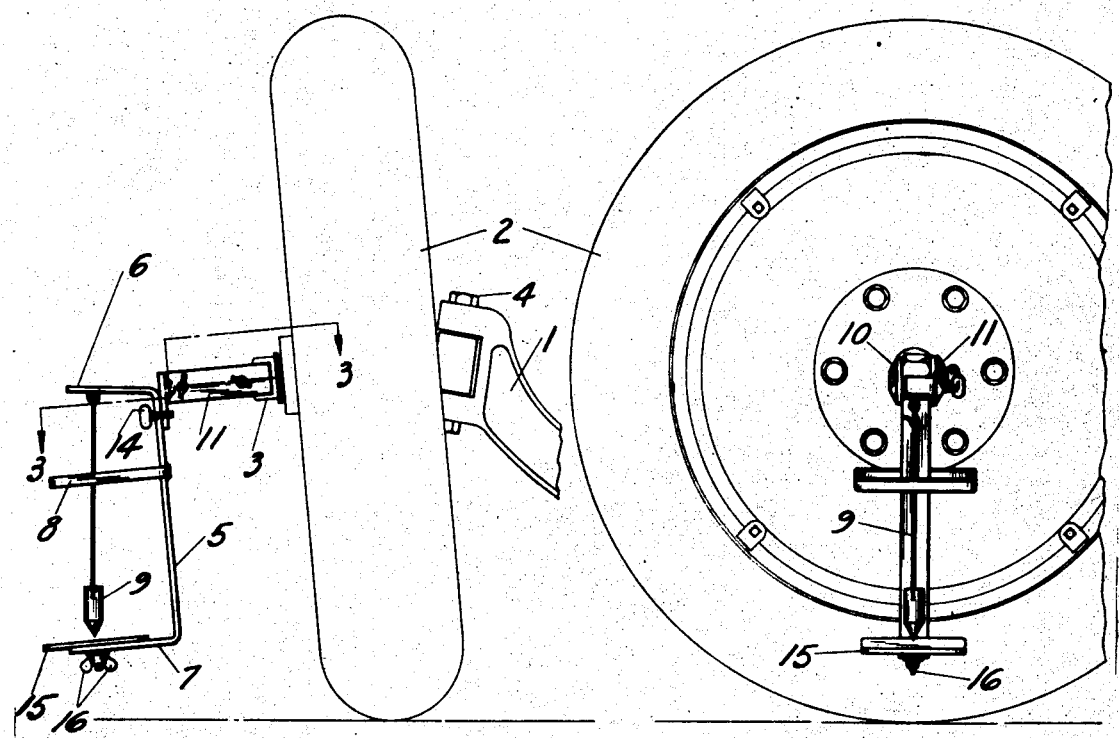
FIG-1  FIG-2
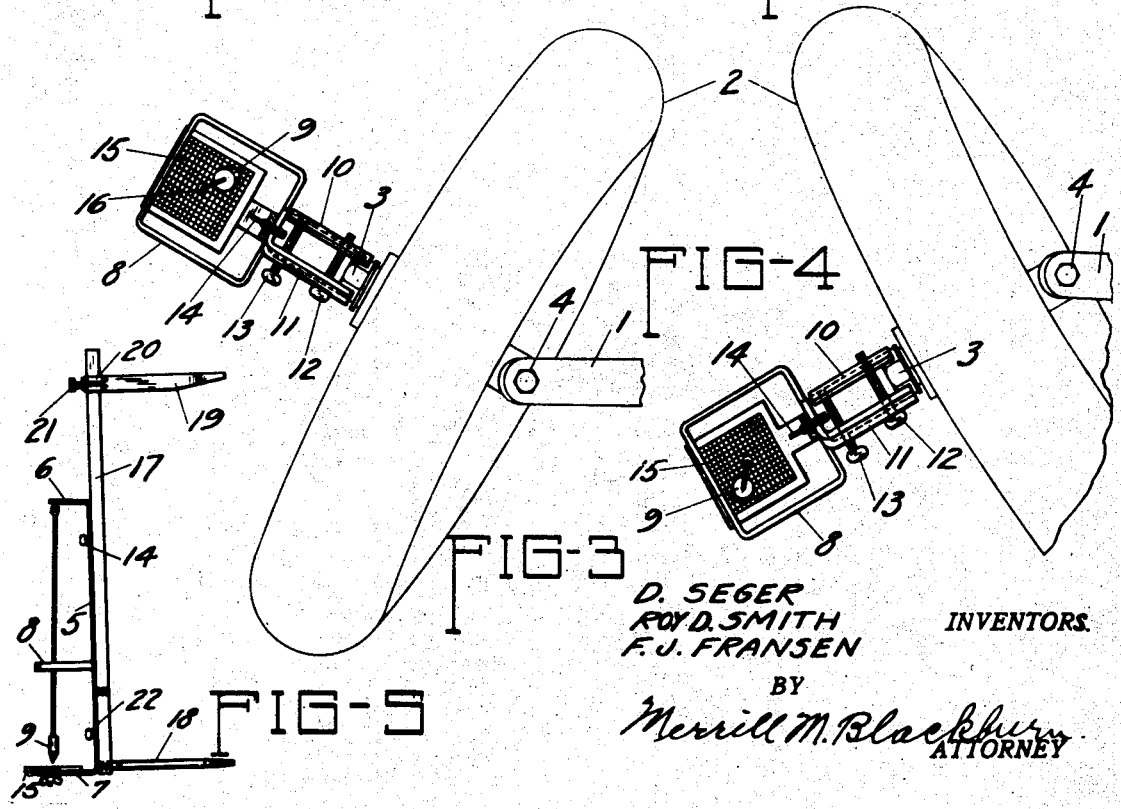
FIG-4
FIG-3
FIG-5
D. SEGER
ROY D. SMITH   INVENTORS.
F. J. FRANSEN
BY
Merrill M. Blackburn
ATTORNEY Patented May 7, 1935

2,000,865

UNITED STATES PATENT OFFICE 2,000,865

KINGPIN ANGLE GAUGE

Dana Seger and Roy D. Smith, Davenport, Iowa, and Frank J. Fransen, Rock Island, Ill., assignors to Geo. L. Hunt Automotive Equipment Co., Davenport, Iowa Application September 1, 1932, Serial No. 631,352

7 Claims. (Cl. 33—203)

The present invention relates to means for determining at one operation the inclination of the king pin, both laterally and fore and aft. Among the objects of this invention are to provide a simple device for the purpose stated; to provide an easily operated mechanism for the intended purpose; to provide an apparatus of the nature indicated which is easily applied and adjusted for use in connection with the spindle of an automobile wheel; and such further objects, advantages and capabilities as will hereafter appear and as are inherent in the construction disclosed herein. Our invention further resides in the combination, construction and arrangement of parts illustrated in the accompanying drawing and, while we consider that the structure disclosed herein is the preferable form of this invention, we do not wish to be limited to the mechanism disclosed but desire that this disclosure be interpreted in an illustrative sense.

In the drawing annexed hereto and forming a part hereof,

Fig. 1 may be regarded as a front elevation of an automobile wheel and the end of a front axle, the same showing our invention applied thereto and in elevation;

Fig. 2 is an elevation taken at a right angle to Fig. 1;

Figs. 3 and 4 are plan sections taken substantially along the plane indicated by the line 3—3, Fig. 1, and illustrate the effect of turning the wheel to right or left, as disclosed by the gauge;

Fig. 5 is an elevation of a slight modification of this gauge adapting it for use as a camber gauge.

In the annexed drawing, numerals 1 and 2 indicate generically an automobile axle and wheel, numeral 3 the spindle nut, and numeral 4 the king pin connecting the axle and spindle. These are all old structure and therefore do not need any further description. However, it is noted that the inclination of the wheel, as well as the king pin, is shown exaggerated in order to bring out the fact that there is such inclination.

As is well known, the king pin, in automobiles as generally constructed, inclines inwardly and backwardly at the top. There is such an angle between the spindle and the king pin that notwithstanding the inward inclination of the king pin, the wheel inclines outwardly at the top. It will be seen that as the spindle is caused to turn about the king pin it will describe a section of a very flat cone whose axis is the axis of the king pin and whose base plane is inclined slightly from the horizontal, the inclination being toward the rear and toward the vehicle.

The gauge comprises a body member 5 having upper and lower arms 6 and 7, a guard ring 8, pendulum 9, and supporting bracket members 10 and 11. Screws 12 and 13 serve as clamping means whereby the arms 10 and 11 may be securely fastened to the spindle nut 3. A screw 14 serves to connect the body member 5 to the arm 11 and is adjustable so that the body member may be turned into a vertical plane notwithstanding the fact that the nut 3 may not be so positioned as to bring the body member into a vertical plane when the angularly grooved members 10 and 11 engage two opposite angles of the nut. The graduated plate 15 is held to the arm 7 by a nut and bolt 16, as shown most clearly in Fig. 1. The arm 7 has a longitudinal slot for the reception of a parallel-sided lug formed on the under face of the plate 15. This makes it possible to slide the plate in and out with relation to member 5 without in any way changing its angular relation thereto. It will therefore be seen that the plate may be adjusted to bring its center under the point of the pendulum or plumb bob 9 when the gauge is adjusted to proper position with the wheels set substantially straight ahead.

It is a fact that when the wheel is turned from the position shown in Fig. 1 to the position shown in Fig. 3 the rearward inclination of the top of the king pin will cause the pendulum to move with relation to the plate 15 in a direction substantially perpendicular to the plane of the wheel, while the lateral inclination of the king pin will cause the pendulum to swing in a direction generally transverse to the spindle or roughly parallel to the wheel. On the other hand, turning the wheel in the direction indicated in Fig. 4 will cause the pendulum to move toward the opposite side of the plate 15.

In reading king pin angle and caster, it is essential for the sake of accuracy to turn the steering wheel both to the right and to the left and read, on the gauge, both angles. The implements, as manufactured, are designed to read correctly when the vehicle wheels are turned through an angle of fifty degrees (50°), divided equally on both sides of the straight ahead position. Readings at any other degree of turning will therefore not be accurate. The instrument might be designed to give correct reading at some other position but the foregoing is the amount we have chosen. It is desired to point out that king pin inclination or angle causes a slight rotation of the spindle about its axis as the spindle turns about the king pin and that this is what causes the pendulum to move toward the front or the rear edge of the plate 15 when the wheel 2 is turned from the position of Fig. 1 toward that of Fig. 3 or Fig. 4.

The means whereby this device is adapted for use as a camber gauge will next be described. This comprises a supporting bar 17 having a single laterally extending bracket 18 adjustably secured adjacent one end and a horizontally V-shaped bracket 19 adjustably mounted adjacent the opposite end to be slid along the bar 17 in adjusting the distance between the brackets 18 and 19. Preferably, the end of the bracket 18 which is attached to the bar 17 is reduced and screw-threaded to be turned into spaced apertures in bar 17 so that it may be moved closer to or farther away from the end of said bar. We prefer to provide bracket 18 with a hole extending transversely therethrough so that a suitable punch, bolt, or the like may be inserted therein so as to turn the bracket until it is tight. The bracket 19 is provided with a yoke 20 which surrounds the bar or post 17 and has a set screw 21 therein for engagement with the bar to hold the bracket in adjusted position. By adjusting the brackets 18 and 19 longitudinally of the bar or post 17, one may adapt this camber gauge for use with wheels of large or small diameter, including wheels having a felloe diameter of about eleven inches up to wheels having a felloe diameter of about twenty-four inches. Of course, in event of necessity, the post 17 could be made longer in order to span a wheel having a larger diameter and a suitable hole could be made in the post 17 for attachment of bracket 18 so as to make this device adaptable to wheels having a smaller felloe diameter. However, it is believed that the present construction is entirely ample for all wheels as now constructed.

In order to attach the post 17 to the body member 5, screw 14 is removed from member 11, thus permitting this member to be detached. The post is then applied to the member 5 and screw 14 is screwed into a suitable hole in post 17, thus fastening these two members together. Other aligning holes are formed near the lower extremities of the members 5 and 17 and a screw 22, corresponding to screw 14, is inserted to bind these members together. It will therefore be seen that when the ends of the brackets 18 and 19 are set against the felloe and the post 17 is turned laterally until the plumb bob 9 points to the zero line, laterally, of plate 15, the post 17 will be in a vertical plane transverse to the plane of the wheel and passing through the center thereof. If the nut 16 is loosened so as to permit the plate 15 to be slid along the bar 7 as far as possible, the plumb bob 9 will be just in line with the inner gauge line of the plate when the bar 17 is vertical. Therefore, when this device is applied to a wheel, the plumb bob will swing outwardly on the plate 15 and the number of lines will indicate the number of degrees of camber which the wheel has.

It is believed that from the foregoing description, taken in connection with the annexed drawing, it will be clear that the inclination of the king pin, both laterally and forwardly-backwardly, may be read by means of this implement and in a very simple manner. It will also be apparent that the number of degrees of inclination of the plane of the wheel from a vertical can be read directly upon the graduated plate.

It is of course understood that the specific description of structure set forth above may be departed from without departing from the spirit of our invention as set forth in this specification and the appended claims.

Having now described our invention, we claim:

1. A king pin inclination gauge comprising a body member adapted to be supported upon an axle spindle to move therewith, a rectangularly graduated plate supported adjacent the lower end of the body member, a rigid pendulum supported from the upper part of the body member and having an indicating point adjacent the plate to cooperate with the graduations thereon to indicate movement of the pendulum relatively thereto, the plate being graduated to read correctly the inclination of the king pin of an automobile wheel when the spindle is turned through a definite angle about the king pin, and a guard mounted on the body between the plate and the upper part of the body to restrict the movement of the pendulum with respect to the plate but permit it to have free movement over the entire surface of the plate.

2. A gauge for determining king pin and spindle angles comprising a body member having a clamp secured thereto, said clamp being adjustably secured to the body member to permit adjustment of the latter with relation to the former in a plane substantially at a right angle to the axis of the spindle to which secured, and said clamp being attachable to the spindle nut of an automobile axle, arms projecting from the body member adjacent its upper and lower ends, a graduated plate supported by the lower arm, and a pendulum suspended from the upper arm and adapted to swing in close proximity to the graduated face of said plate, the plate being graduated to read correctly the inclinations of the king pin of an automobile wheel when the spindle is turned through a definite angle about the king pin as an axis.

3. A structure as defined by claim 2 in which the lower arm is provided with a slot and the graduated plate is provided with a lug fitting in said slot, said plate and arm being connected by adjustable means permitting the plate to be secured in various adjusted positions with relation to the arm.

4. A king pin inclination gauge comprising a body member adapted to be supported upon an axle spindle to move therewith, a rectangularly graduated plate supported adjacent the lower end of the body member, a pendulum supported from the upper part of the body member and having an indicating point adjacent the plate to cooperate with the graduations thereon to indicate movement of the pendulum relatively thereto, the pendulum comprising a rod screw-threaded at its lower end and a plumb bob having a screw-threaded aperture in its upper end for connection with the rod, the two being relatively adjustable so that the distance of the plumb bob from the plate may be adjusted as desired.

5. A king pin inclination gauge comprising a body member adapted to be supported upon an axle spindle to move therewith, a rectangularly graduated plate supported adjacent the lower end of the body member, and a pendulum supported from the upper part of the body member and having an indicating point adjacent the plate to cooperate with the graduations thereon to indicate movement of the pendulum relatively thereto, the plate being graduated to read correctly the inclinations of a king pin of an automobile wheel when the spindle is turned through a definite angle about the king pin, and the pendulum comprising a rod screw-threaded at its lower end and a plumb bob having a screw-threaded aperture in its upper end for connection with the rod, the two being relatively adjustable so that the distance of the plumb bob from the plate may be adjusted as desired.

6. An implement for the purpose indicated comprising a body member having laterally projecting arms adjacent its normally upper and lower ends, a rectangularly graduated plate supported by the normally lower arm for sliding movement with relation thereto to secure proper adjustment, a rigid pendulum supported from the upper arm and provided with a free point at its lower end adjacent the graduated plate, and a clamp secured to the upper part of the body member and adapted to grip the spindle nut of an automobile wheel, said implement having a pendulum guard surrounding the pendulum and secured to the body member, the guard permitting free swinging of the pendulum over the entire surface of the graduated plate but restricting movement of the pendulum to the vicinity of the plate.

7. A structure for the purpose indicated comprising a body member having adjacent its upper and lower ends laterally projecting arms to one of which is connected a rectangularly graduated plate and to the other of which is pivotally connected a rigid pendulum, and a clamp adjustably connected to the body member, said clamp extending in the opposite direction from said arms.

DANA SEGER.
ROY D. SMITH.
FRANK J. FRANSEN.